United States Patent
Meyer et al.

(10) Patent No.: US 12,317,883 B2
(45) Date of Patent: Jun. 3, 2025

(54) BUG SWATTER WITH COVER MEMBER

(71) Applicants: Kelly E. Meyer, Placida, FL (US);
Joshua D. Meyer, Lafayette, CO (US);
Douglas G. Meyer, Placida, FL (US)

(72) Inventors: Kelly E. Meyer, Placida, FL (US);
Joshua D. Meyer, Lafayette, CO (US);
Douglas G. Meyer, Placida, FL (US)

(73) Assignee: KEM PRODUCTS LLC, Placida, FL (US)

( * ) Notice: Subject to any disclaimer, the term of this patent is extended or adjusted under 35 U.S.C. 154(b) by 0 days.

(21) Appl. No.: 18/103,362

(22) Filed: Jan. 30, 2023

(65) Prior Publication Data

US 2023/0354797 A1    Nov. 9, 2023

Related U.S. Application Data

(60) Provisional application No. 63/310,048, filed on Feb. 14, 2022.

(51) Int. Cl.
*A01M 3/02*        (2006.01)
(52) U.S. Cl.
CPC ..................... *A01M 3/02* (2013.01)
(58) Field of Classification Search
CPC ............ A01M 3/00; A01M 3/02; A46B 7/023
USPC .......................................................... 43/137
See application file for complete search history.

(56) References Cited

U.S. PATENT DOCUMENTS

| | | | | |
|---|---|---|---|---|
| 1,179,303 A | * | 4/1916 | Hanlon | A01M 3/02 43/137 |
| 1,263,988 A | * | 4/1918 | Youngs | A01M 3/02 43/137 |
| 1,591,870 A | * | 7/1926 | Wood | A01M 3/02 43/137 |
| 1,694,069 A | * | 12/1928 | Lombard | A01M 3/02 43/137 |

(Continued)

FOREIGN PATENT DOCUMENTS

| CN | 1868273 A | 11/2006 |
|---|---|---|
| CN | 20346749 | 3/2014 |
| DE | 202020003405 | 10/2020 |

OTHER PUBLICATIONS

Search Report and Written Opinion for PCT/US2023/011900, WO2023/154191, published Aug. 17, 2023.

(Continued)

*Primary Examiner* — Brady W Frazier

(57) ABSTRACT

A bug swatter is provided that reduces the chances that bug remains will come into contact with an object or surface in an undesirable manner. The bug swatter is made up of a swatter body having a swatter head connected to a handle portion, wherein the handle portion can be manipulated by a user so the user can advance the swatter head towards a bug to swat the bug. A cover member is connectable to the handle portion and moveable relative to the swatter head, wherein the bug swatter can be moved from an uncovered configuration where the swatter head is uncovered by the cover member to a covered configuration where at least a portion of the cover member covers at least a portion of the swatter head. The bug swatter can also have a locking mechanism adapted to lock the bug swatter in the uncovered configuration or the covered configuration. The locking mechanism can be unlocked by a user. A method of swatting a bug is also provided.

19 Claims, 7 Drawing Sheets

(56) References Cited

U.S. PATENT DOCUMENTS

| | | | | |
|---|---|---|---|---|
| 2,015,092 | A | | 9/1935 | Turnquist |
| 2,126,311 | A | * | 8/1938 | Cowen .................... A01M 3/02 15/144.4 |
| 2,312,780 | A | | 3/1943 | Sorkind |
| 2,618,882 | A | | 9/1947 | Martin |
| 2,485,822 | A | * | 10/1949 | Goldrich ................ G10D 13/12 984/150 |
| 2,735,217 | A | * | 2/1956 | Hufnagel ................ A01M 3/02 D22/124 |
| 3,364,512 | A | | 1/1968 | Yamashita |
| 3,412,501 | A | * | 11/1968 | Rosen .................... A01M 3/02 43/137 |
| 4,120,114 | A | * | 10/1978 | Little .................... A01M 3/02 43/137 |
| 4,227,278 | A | * | 10/1980 | Raskin ................... A47L 13/38 15/234 |
| 4,694,605 | A | * | 9/1987 | Garcia ................... A01M 3/02 43/137 |
| 4,910,909 | A | * | 3/1990 | Johnson ................. A01M 3/02 43/137 |
| 4,924,358 | A | * | 5/1990 | Von Heck ............ G02B 6/0005 439/219 |
| 5,207,018 | A | | 5/1993 | Reaver |
| 5,537,777 | A | * | 7/1996 | Geeting .................. A01M 3/00 15/119.1 |
| 6,161,328 | A | * | 12/2000 | Sing ........................ A01M 3/02 15/174 |
| 2008/0190012 | A1 | * | 8/2008 | Chanthalangsy ....... A01M 3/02 43/137 |
| 2009/0158636 | A1 | | 6/2009 | Rosario |
| 2010/0037511 | A1 | * | 2/2010 | Schier .................... A01M 3/02 43/137 |
| 2022/0279917 | A1 | * | 9/2022 | Norton ................. A46B 5/0095 |

OTHER PUBLICATIONS

Flyswatter cover, available from Etsy at "https://www.etsy.com/listing/1362621167/flyswatter-cover", date unknown.

Telescopic Keychain Fly Swatter, available from Island Dogs at "https://www.islanddogs.com/products/telescopic-keychain-fly-swatter", date unknown.

* cited by examiner

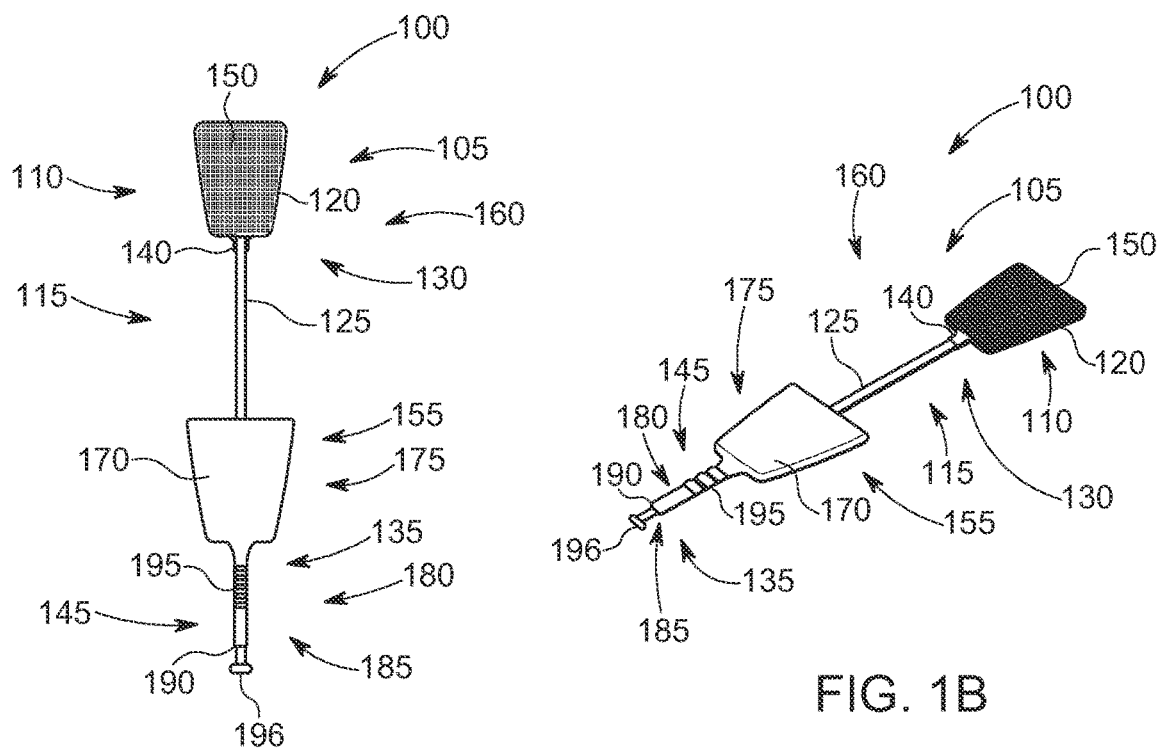
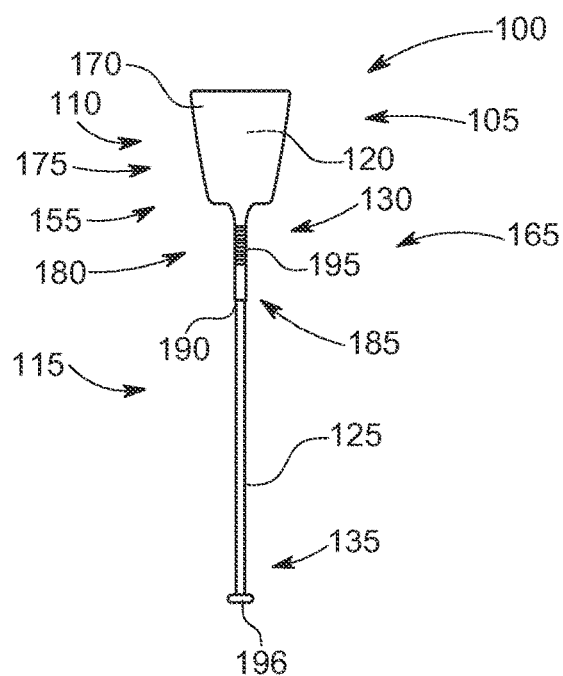
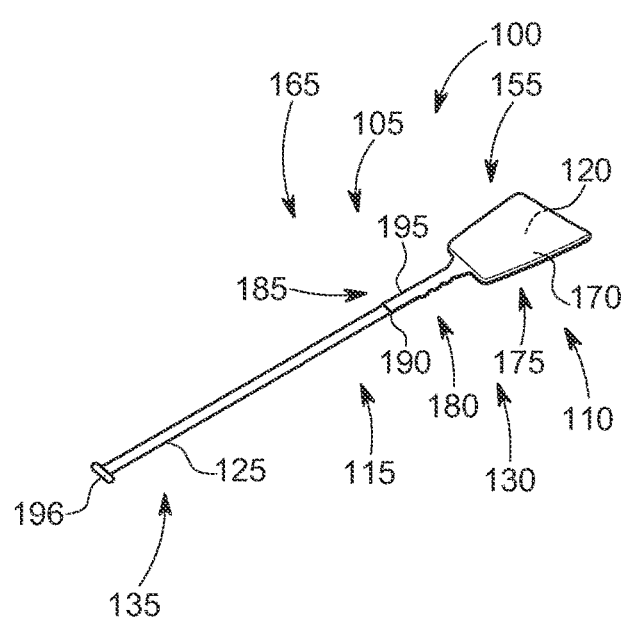
FIG. 1A
FIG. 1B
FIG. 1C
FIG. 1D

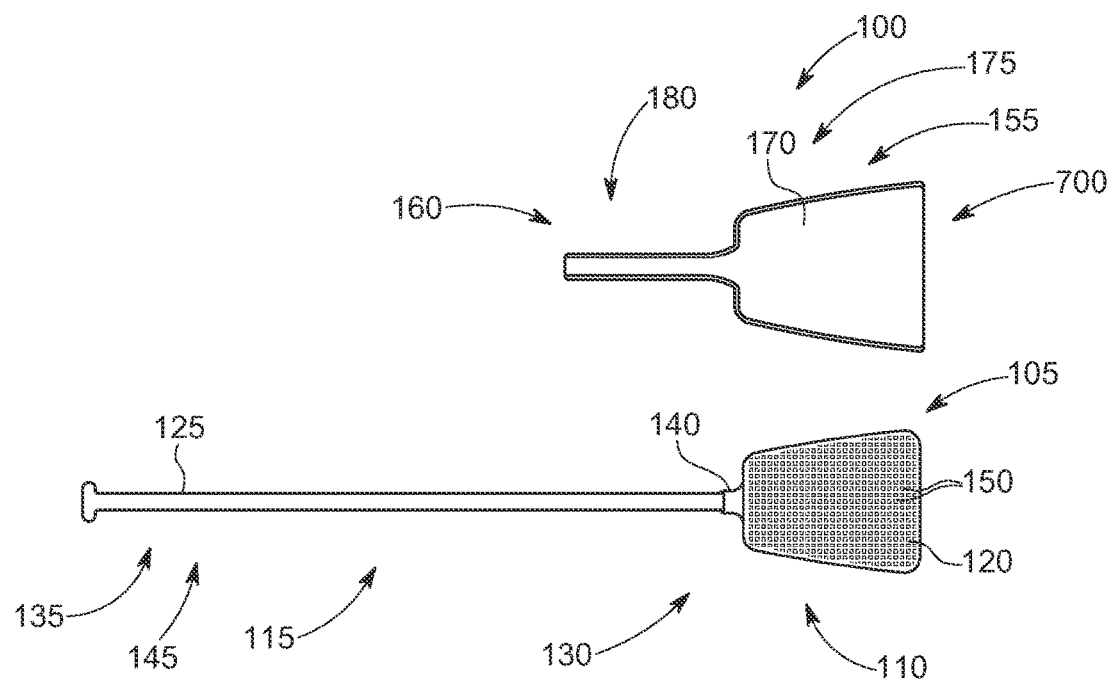
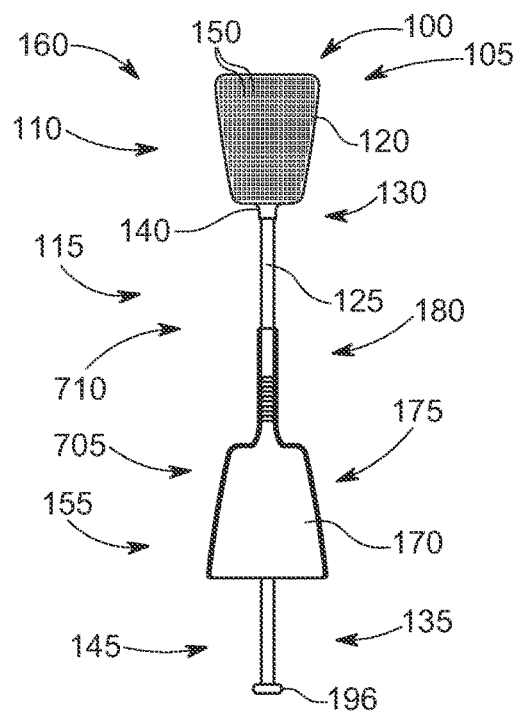 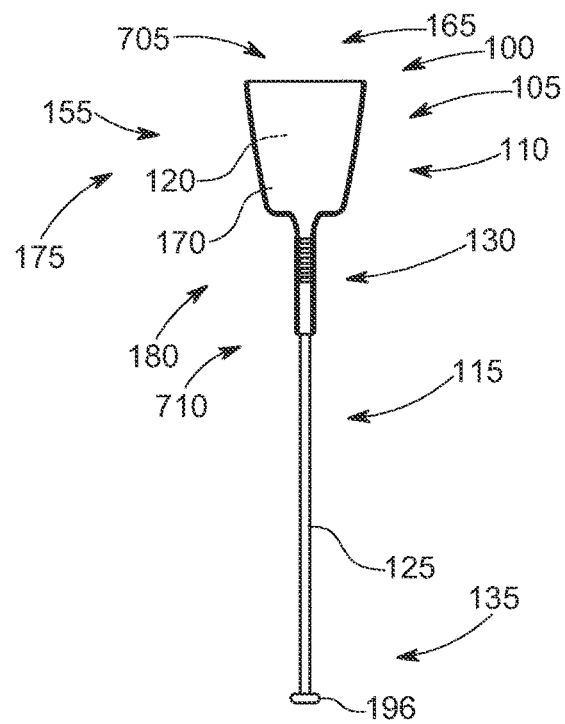
FIG. 7A
FIG. 7B
FIG. 7C

BUG SWATTER WITH COVER MEMBER

PRIORITY

The present application claims the benefit of domestic priority based on United States Provisional Patent Application 63/310,048 filed on Feb. 14, 2022, the entirety of which is incorporated herein by reference.

BACKGROUND

Few things are as annoying as a fly or other bug buzzing around. When this happens, the elimination of the bug is of paramount importance, but the aftermath of the killing of the bug can end up being equally as unpleasant.

The swatting of flies and other bugs has taken place throughout history. Any swingable object within a person's reach has been used to bring about a fly's demise. When an object isn't available, a person may resort to using his or her own hands. However, a fly is not always easy to swat. Flies are able to detect micro changes in air currents and pressure that are created when an object is swung toward them. This warning system gives the fly time to escape before being squashed by the object. This evasion technique is so effective and so ubiquitously well-known it is often referred to in modern culture, such as when Mr. Miyagi tells Daniel Caruso in The Karate Kid that anyone who can catch a fly with chopsticks can accomplish anything. What the movie fails to mention, though, is that even when the difficult task is accomplished, there are still fly guts on the chopsticks.

It was discovered long ago that the effectiveness of the fly swatting process can be improved by reducing the air currents that are presented to the fly as an object is swung towards the fly. In ancient times, the plant equisetum, also known as horsetail, snake grass, and puzzlegrass, was used as a swatting object because the whorls of branches and leaves allowed just enough air to pass through to evade the defense of the fly. In more modern times, human-made implements for swatting flies have been developed. In 1900, Robert Montgomery invented what is believed to be the first modern fly killing implement and patented it as U.S. Pat. No. 640,790. The "cheap device of unusual elasticity and durability" made of wire netting and attached to a handle reduced wind drag, allowing the device to be used in a "whiplike swing." The term "swatter" came about five years later when Samuel Crumbine, the Secretary of Kansas Board of Health and avid baseball fan, used a term often heard in ballpark chants to name the device the fly swatter, a generic name that has been used since.

Today's fly swatter is a fly killing device that has a vented or perforated head attached to a handle. Typically, the device is lightweight but sufficiently stiff to be able to be whipped or swung at a high velocity so that the head can contact a fly and squish it against a surface or in mid-flight. While effective at killing flies, conventional fly swatters have the undesirable effect that following the swatting of a fly, the squished fly remains on the head of the swatter. These remains may sometimes be wiped or washed off. However, most often the remains are allowed to stay on the head until it decays or falls off. Accordingly, any object or surface that the head of the swatter comes in contact with will be exposed to fly guts. Of course, insects or bugs other than flies can also be killed with the swatter but with the same undesirable effect of bug guts being smeared on the head of the swatter.

There is therefore a need for an improved bug swatter. There is further a need for a bug swatter that reduces the chances that bug remains will come into contact with an object or surface other than the swatter.

SUMMARY

The present invention satisfies these needs. In one aspect of the invention, an improved bug swatter is provided.

In another aspect of the invention, a bug swatter is provided that reduces the chances that bug remains will come into contact with an object or surface in an undesirable manner.

In another aspect of the invention, a bug swatter includes a cover member adapted to cover at least a portion of a swatter head.

In another aspect of the invention, a bug swatter includes a swatter head, a handle portion, and a swatter head cover member guided along the handle portion.

In another aspect of the invention, a bug swatter includes a swatter head, a handle portion, and a swatter head cover member moveable between an uncovered configuration and a covered configuration.

In another aspect of the invention, a bug swatter includes a swatter head, a handle portion, and a swatter head cover member slidably received on the handle portion.

In another aspect of the invention, a bug swatter includes a swatter head, a handle portion, and a swatter head cover member slidably received on the handle portion, wherein the swatter head cover member is lockable in an uncovered configuration and/or in a covered configuration.

In another aspect of the invention, a method swatting a bug includes the steps of providing a bug swatter including a swatter head, a handle portion, and a swatter head cover member, the swatter head cover member being moveable relative to the swatter head from an uncovered configuration to a covered configuration; while in the uncovered configuration, swatting a bug with the swatter head; and moving the swatter head cover from the uncovered configuration to the covered configuration.

In another aspect of the invention, a method swatting a bug includes the steps of providing a bug swatter including a swatter head, a handle portion, and a swatter head cover member, the swatter head cover member being slidable along the handle portion from an uncovered configuration to a covered configuration; while in the uncovered configuration, swatting a bug with the swatter head; and sliding the swatter head cover from the uncovered configuration to the covered configuration to at least partially cover the swatter head.

In another aspect of the invention, a method swatting a bug includes the steps of providing a bug swatter including a swatter head, a handle portion, and a swatter head cover member, the swatter head cover member being slidable along the handle portion from an uncovered configuration to a covered configuration; while the bug swatter is locked in the uncovered configuration, swatting a bug with the swatter head; unlocking the swatter head cover member and sliding the swatter head cover from the uncovered configuration to the covered configuration to at least partially cover the swatter head; and locking the swatter head cover member in the covered configuration.

In another aspect of the invention, a bug swatter comprises a swatter body comprising a swatter head connected to a handle portion, wherein the handle portion can be manipulated by a user so the user can advance the swatter head towards a bug to swat the bug; and a cover member connectable to the handle portion and moveable relative to the swatter head, wherein the bug swatter can be moved from an uncovered configuration where the swatter head is uncovered by the cover member to a covered configuration where at least a portion of the cover member covers at least a portion of the swatter head.

In another aspect of the invention, a bug swatter comprises a swatter body comprising a swatter head connected to a handle portion, wherein the handle portion can be manipulated by a user so the user can advance the swatter head towards a bug to swat the bug; and a cover member connectable to the handle portion and moveable relative to the swatter head, wherein the bug swatter can be moved from an uncovered configuration where the swatter head is uncovered by the cover member to a covered configuration where at least a portion of the cover member covers at least a portion of the swatter head, wherein the bug swatter comprises a locking mechanism adapted to lock the bug swatter in the uncovered configuration or the covered configuration.

In another aspect of the invention, a bug swatter comprises a swatter body comprising a swatter head connected to a handle portion, wherein the handle portion can be manipulated by a user so the user can advance the swatter head towards a bug to swat the bug; and a cover member connectable to the handle portion and moveable relative to the swatter head, wherein the bug swatter can be moved from an uncovered configuration where the swatter head is uncovered by the cover member to a covered configuration where at least a portion of the cover member covers at least a portion of the swatter head, wherein the bug swatter comprises a locking mechanism adapted to lock the bug swatter in the uncovered configuration or the covered configuration and wherein the locking mechanism can be unlocked by the user applying a sufficiently strong force to overcome the locking mechanism.

In another aspect of the invention, a bug swatter comprises a swatter body comprising a swatter head connected to a handle portion, wherein the handle portion can be manipulated by a user so the user can advance the swatter head towards a bug to swat the bug; a cover member connectable to the handle portion and slidable on a shaft of the handle portion, and a locking mechanism adapted to lock the cover member at a position on the shaft by preventing movement of the cover member in one or more directions on the shaft until the locking mechanism is unlocked.

In another aspect of the invention, a bug swatter comprises a swatter body comprising a swatter head connected to a handle portion, wherein the handle portion can be manipulated by a user so the user can advance the swatter head towards a bug to swat the bug; a cover member connectable to the handle portion and slidable on a shaft of the handle portion, and a locking mechanism adapted to lock the cover member at a position on the shaft by preventing movement of the cover member in one or more directions on the shaft until the locking mechanism is unlocked, wherein the locking mechanism can be unlocked by the user applying a sufficiently strong force to overcome the locking mechanism.

In another aspect of the invention, a method of swatting a bug comprises providing a bug swatter comprising a swatter body comprising a swatter head connected to a handle portion, wherein the handle portion can be manipulated by a user so the user can advance the swatter head towards a bug to swat the bug and a cover member connectable to the handle portion and moveable relative to the swatter head; positioning the bug swatter in an uncovered configuration where the swatter head is uncovered by the cover member; swatting a bug by advancing the swatter head towards the bug; and moving the bug swatter to a covered configuration where at least a portion of the cover member covers at least a portion of the swatter head.

In another aspect of the invention, a method of swatting a bug comprises providing a bug swatter comprising a swatter body comprising a swatter head connected to a handle portion, wherein the handle portion can be manipulated by a user so the user can advance the swatter head towards a bug to swat the bug and a cover member connectable to the handle portion and moveable relative to the swatter head; positioning the bug swatter in an uncovered configuration where the swatter head is uncovered by the cover member; swatting a bug by advancing the swatter head towards the bug; and moving the bug swatter to a covered configuration where at least a portion of the cover member covers at least a portion of the swatter head, further comprising locking the bug swatter in the uncovered configuration or the covered configuration.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

FIG. 1A is a schematic top view of a bug swatter according to the invention in an uncovered configuration;

FIG. 1B is a schematic perspective view of the bug swatter of FIG. 1A in an uncovered configuration;

FIG. 1C is a schematic top view of the bug swatter of FIG. 1A in a covered configuration;

FIG. 1D is a schematic perspective view of the bug swatter of FIG. 1A in a covered configuration;

FIG. 7A is a schematic top view of another version of a bug swatter of the invention in an uncovered configuration;

FIG. 7B is a schematic top view of another version of a bug swatter of the invention in an uncovered configuration; and FIG. 7C is a schematic top view of the bug swatter of FIG. 7B in a covered configuration.

DESCRIPTION

Figure 2A:
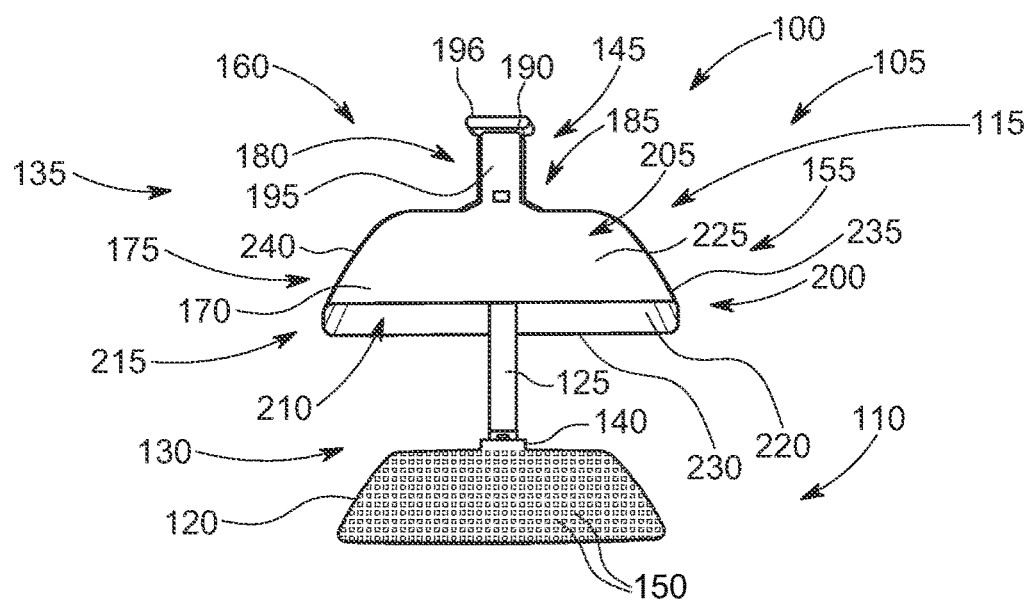
FIG. 2A is a schematic front perspective view of another version of a bug swatter of the invention.

The present invention relates to a bug swatter. In particular, the invention relates to an improved bug swatter with a swatter head cover. Although the bug swatter is illustrated and described in the context of being useful for swatting flies and other bugs, the present invention can be useful in other instances. Accordingly, the present invention is not intended to be limited to the examples and embodiments described herein.

FIG. 1A shows a bug swatter 100 according to one version of the invention. The bug swatter has a swatter body 105 made up of a swatter head 110 connected to a handle portion 115. The swatter head 110 includes a swatting member 120. In the version shown, the swatting member 120 is a flat or planar or at least partially flat or planar piece of material that is adapted to be swung or otherwise advanced towards a bug, such as a fly, for the purpose of squishing the bug. The squishing of the bug can be accomplished by compressing the bug between the swatting member 120 and another surface, such as a wall or table, or by contacting the bug in midair and injuring the bug in midflight or midflit. The handle portion 115 includes a shaft 125 having a forward portion 130 and a rearward portion 135. The forward portion 130 of the shaft 125 is connected to the swatter head 110 by a connection member 140. The connection member 140 can be a releasable connection or a permanent connection or can be a one-piece transition of the handle portion 115 into the swatter head 110. The rearward portion 135 includes a graspable portion 145 that is adapted to be grasped by a user in a manner so that the swatter head 110 can be swung at a bug by manipulation of the handle portion 115. The graspable portion can include a grip member or can merely be a portion of the shaft 125. In one version, the shaft 125 is sufficiently stiff to support the weight of the swatter head 110 without significant deformation but sufficiently flexible to allow the swatter head 110 to be swung in a whipping motion and/or to prevent excessive damage to a surface that the swatter head hits.

In one version, the bug swatter 100 has a swatting member 120 with one or more perforations 150. The perforations 150 are designed to reduce the air currents produced by the advancement of the swatting member 120 towards the bug to be swatted. Some bugs, in particular flies, are able to sense these air currents and evade the swat in the absence of the perforations 150. Alternatively, in another version, the swatting member 120 can be solid and lack any perforations. The version without perforations can be useful for swatting very small bugs and/or slow moving bugs. The swatting member 120 can be made of the same or different material than the shaft 125 and can also be sufficiently rigid to kill a targeted bug and to support its own weight in a desired shape, such as a generally flat shape, but is also sufficiently flexible to be able to bend or deform enough to prevent damaging surfaces contacted.

As shown in FIGS. 1A through 1D, the bug swatter 100 of the present invention also includes a cover member 155. The cover member 155 is designed to selectively cover the swatter head 110 of the bug swatter 100. The cover member 155 is moveable from a first position to a second position so that the bug swatter 100 may be in an uncovered configuration 160, such as shown in FIGS. 1A and 1B, and in a covered configuration 165, such as shown in FIGS. 1C and 1D. In the uncovered configuration 160, the swatter head 110 is uncovered or exposed. In the covered configuration 165, the cover member 155 covers at least a portion of the swatter head 110. By cover it is meant that at least a portion of the cover member overlaps at least a portion of the swatter head 110 when viewed from the top, bottom, or sides of the bug swatter 100. In the uncovered configuration 160, the swatter head 110 is exposed and is available to be used to swat a bug. In the covered configuration 165, at least a portion of the swatter head 110 that would otherwise be available for swatting a bug is covered by the cover member 155.

To use the bug swatter 100, the bug swatter is placed in the uncovered configuration 160. A user then grasps the graspable portion 145 which can be on the shaft 125 or on the cover member 155 or at a different position and swings the swatter head 110 in the direction of a bug to be squished. After successful squishing of the bug by the swatter head 110, bug guts or remains will often be present on the swatter head 110. The cover member 155 can be moved to the covered configuration 165 so that the remains of the squished bug on the swatter head 110 can be covered by the cover member 155. This allows the bug swatter 100 to be stored or carried in a more sanitary manner with reduced risk of the bug remains contacting the user or an undesired surface. The bug swatter 100 can then be maintained in the covered configuration 165 until the next use of the bug swatter 100 and/or until the bug swatter 100 can be cleaned. Alternatively, in another use, the bug swatter can be used in the covered configuration 165 to squish a bug. In this version, the bug can be squished by an outer surface 170 of the cover member 155. This version can be useful, for example, when a very large, very small, and/or very slow moving bug is to be swatted or when a user does not have enough time to move the bug swatter 100 to the uncovered configuration 160.

In the version of FIGS. 1A through 1D, the cover member 155 is slidably attached to the handle portion 115 and is slidable between the uncovered configuration 160 and the covered configuration 165. In this version, the cover member 155 includes a cover portion 175 and a shaft connection portion 180. The shaft connection portion 180 includes a sliding mechanism 185 that allows the cover member 155 to slide along the shaft 125 of the handle portion 115. In the version shown, the sliding mechanism 185 is a lumen 190 or partial lumen that receives the shaft in a sliding engagement. Alternatively, any other sliding mechanism 185 can be provided, such as a tongue and slot type of arrangement. The cover portion 175 is adapted to cover at least a portion of one or more sides of the swatter head 110. The shaft connection portion 180 can also include a cover member graspable portion 195 that can optionally be provided with finger grip projections or indentations. The cover member graspable portion 195 can be used to move the cover member 115 from a retracted position associated with the uncovered configuration 160 to an extended position associated with the covered configuration 165 or the opposite. In addition, the cover member graspable portion 195 can serve as the shaft graspable portion 145 when the bug swatter 100 is being used to swat a bug. The shaft 125 and/or shaft connection portion 180 can include additional optional features. For example, an abutment 196 can be provided to prevent over sliding of the cover portion 155. The abutment 196 or elsewhere on the bug swatter 100 may include an eyelet, hook, or the like that can allow the bug swatter 100 to be hung when being stored. Also, the shaft 125 and/or shaft connection portion 180 can include a feature that prevents relative rotation between the shaft 125 and the cover member 155. For example, the shaft 125 can have a non-circular cross sectional shape and be receivable within a non-circular lumen 190.

Figure 2B:
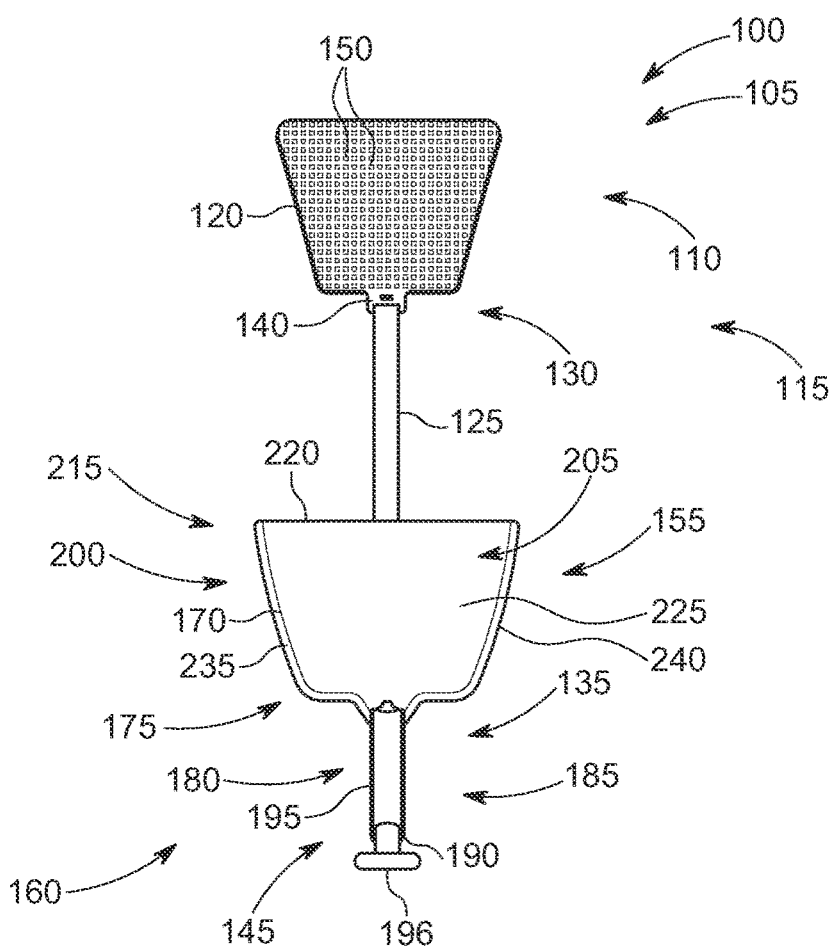
FIG. 2B is a schematic rear perspective view of the bug swatter of FIG. 2A.
Figure 3A:
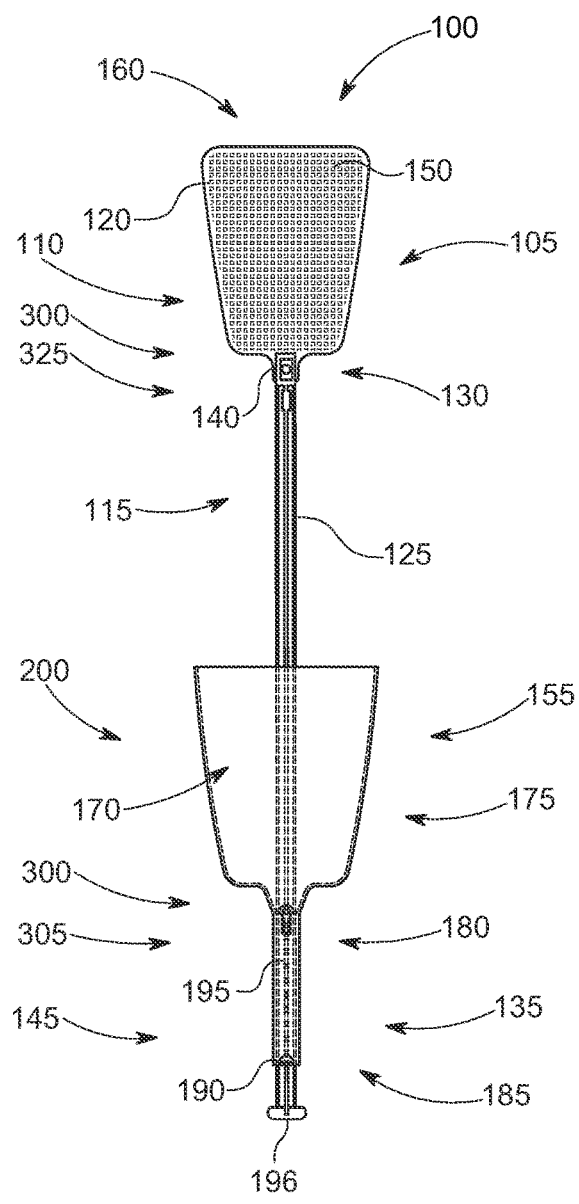
FIG. 3A is a schematic top view of another version of a bug swatter of the invention in an uncovered configuration.
Figure 3B:
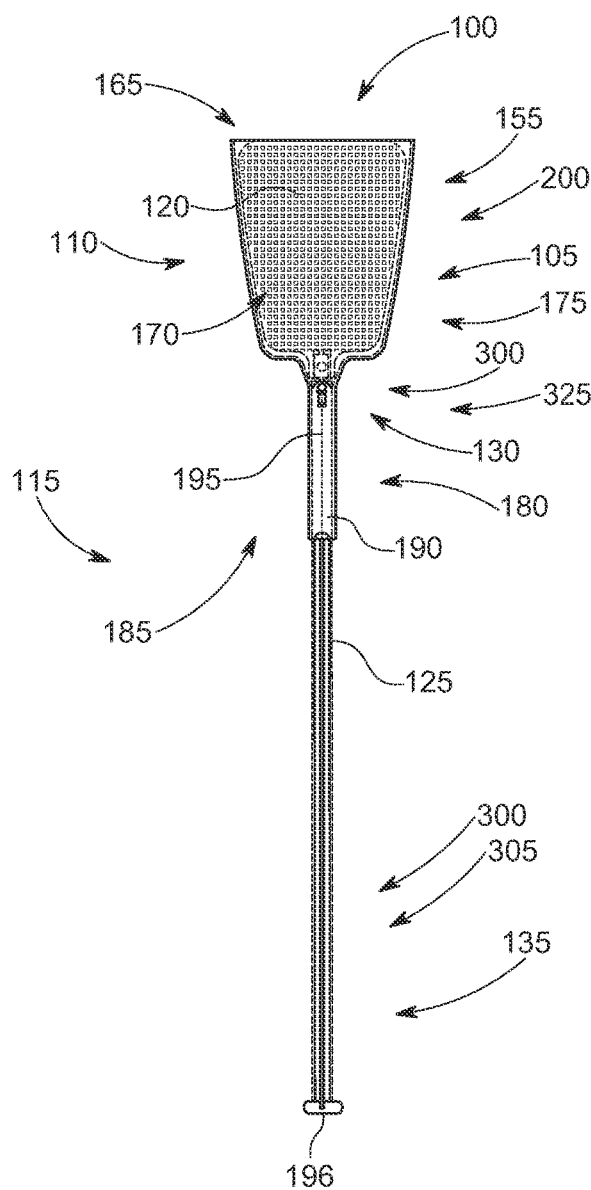
FIG. 3B is a schematic top view of the bug swatter of FIG. 3A in a covered configuration.

A particular version of a bug swatter 100 of the invention is shown in FIGS. 2A and 2B. In this version, the cover portion 175 of the cover member 155 is includes a cover body 200. The cover body 200 has a sidewall 205 that defines a cavity 210. A forward end 215 of the cover body 200 has an opening 220 that provides access to the cavity 210. The sidewall 205 and cavity 210 are sized and shaped so that the swatter head 110 can be received at least partially within the cavity 210 when the bug swatter is in the covered configuration 165. In one version, the cavity 210 receives substantially the entire swatter head 110. In the version shown, the sidewall 205 includes a top wall 225, a bottom wall 230, a left wall 235, and a right wall 240 that surround the swatter head 110 in transverse cross-section when in the covered configuration 165. Alternatively, one or more of the walls can be removed and/or a portion of one or more of the walls can be removed so that the swatter head 110 is partially surrounded in transverse cross-section when in the covered configuration 165. Accordingly, in particular version of the bug swatter 100, the cover body 200 can cover the swatter head 110 in a manner where it surrounds at least about 50%, at least about 60%, at least about 70%, at least about 80%, at least about 90%, or 100% of the swatter head 110 transverse cross-section when in the covered configuration 165. As also shown in the version of FIGS. 2A and 2B, the lumen of the shaft connection portion 180 of the cover member 155 can fully surround the shaft 125. Alternatively, the lumen 190 can partially surround the shaft 125.

Figure 4A:
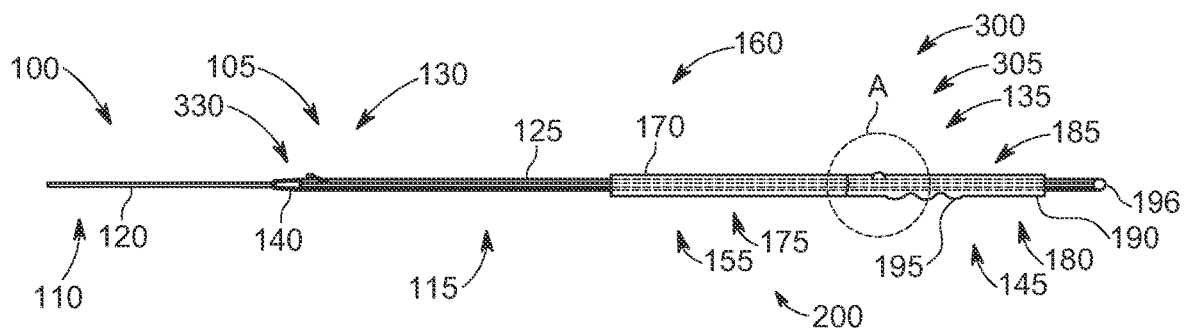
FIG. 4A is a schematic side view of the bug swatter of FIG. 3A in an uncovered configuration.
Figure 4B:
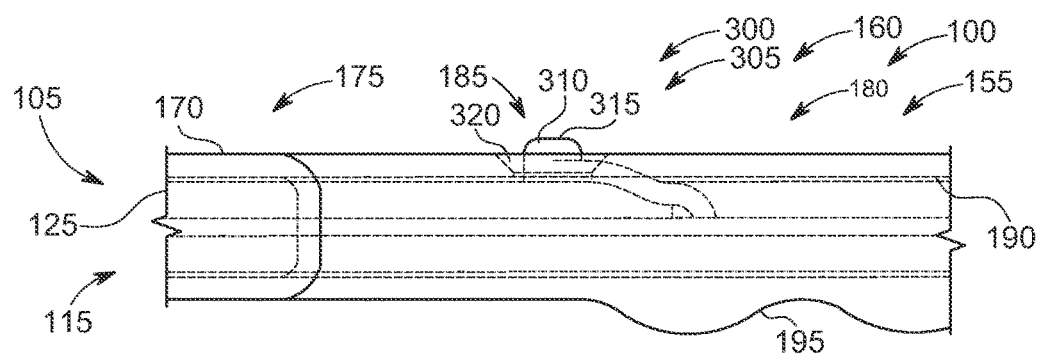
FIG. 4B is a schematic partially sectional side view of an enlarged section of FIG. 4A.
Figure 4C:
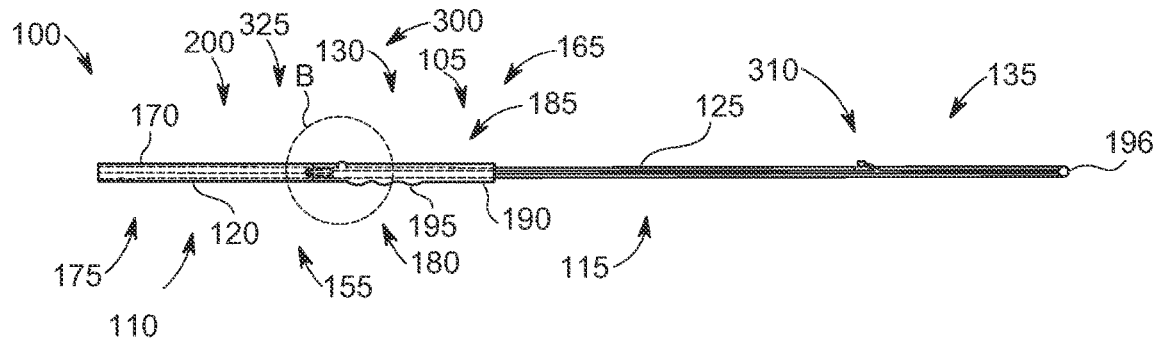
FIG. 4C is a schematic side view of the bug swatter of FIG. 3A in a covered configuration.
Figure 4D:
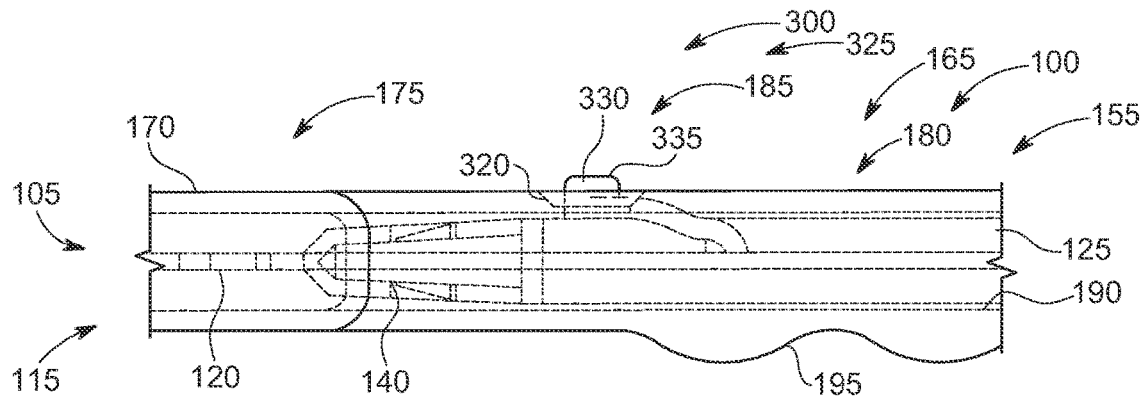
FIG. 4D is a schematic partially sectional side view of an enlarged section of FIG. 4C.

Another version of a bug swatter 100 of the invention is shown in FIGS. 3A, 3B, and 4A through 4D. In this version, the bug swatter 100 includes a locking mechanism 300 for releasably securing the bug swatter 100 in the uncovered configuration 160 and/or in the covered configuration 165. In the particular version shown, the locking mechanism 300 is able to releasably secure the bug swatter 100 in both the uncovered configuration 160 and in the covered configuration 165. As shown in FIG. 4A and enlarged in FIG. 4B in the region of A, the locking mechanism 300 includes an uncovered configuration locking mechanism 305 that includes a button member 310 on the rearward portion 135 of the shaft 125 of the handle member 115. The button member 310 is biased outwardly away from the shaft towards the position shown in FIG. 4B. The button member 310 includes a pressing surface 315 against which a user may apply pressure to overcome the bias and move the button member 310 towards the shaft 125. The cover member 155 has an opening 320 that extends though a wall 325 of the shaft connection portion 180 of the cover member 155. The opening 320 is sized and shaped to receive a portion of the button member 310, as shown in FIG. 4B. When the button member 310 is received in the opening 320, as shown in FIG. 4B, the cover member 155 is prevented from sliding along the shaft 125. In this manner, the cover member 155 is locked in the retracted position shown in the FIGS. 4A and 4B, and the bug swatter is thus locked in the uncovered configuration 160. To release the bug swatter 100 from the locked uncovered configuration 160, a user presses the button member 30 towards the shaft 125 so that the cover member 155 can then be slid over the button member 310 and along the shaft 125. Similarly, the locking mechanism 300 can include a covered configuration locking mechanism 325, as shown in FIG. 4C and enlarged in FIG. 4D in the region of B. The covered configuration locking mechanism 325 also includes a button member 330 having a pressing surface 335 positioned on the forward portion 130 of the shaft 125, forward of the button member 310. The button member 330 of the covered configuration locking mechanism 325 is also biased outwardly away from the shaft 125 and is also receivable within the opening 320 or a different opening to lock the cover member 155 in the extended position shown in FIG. 4D and thus to lock the bug swatter 100 in the covered configuration 165.

The bug swatter 100 can be made of any material suitable to accomplish the design features described herein. For example, the swatter head 110 can be made from one or more of plastic, leather, wire mesh, cloth, and the like. The handle portion 115 can be made from one of more of plastic, metal, wood, telescopic metal or plastic, wire form, and the like. The cover portion 155 can be made from one or more of plastic, rubber, metal, cloth, and the like. The swatter head 110, handle portion 115, and/or cover portion 155 can be made from the same or different materials.

The bug swatter 100 can be any dimension and shape suitable to accomplish the design features described herein. For example, the swatting member 120 can have a swatting surface area from about 8 in$^2$ to about 48 in$^2$, or from about 10 in$^2$ to about 25 in$^2$, or from about 16 in$^2$ to about 18 in$^2$. The swatting member 120 can have a thickness of from about 0.01 inches to about 0.1 inches, or from about 0.02 inches to about 0.06 inches, or from about 0.03 inches to about 0.05 inches. The perforations 150 in the swatting member 120 can have an area so that the percentage of open area of the swatting member 120 is from about 15% to about 60%, or from about 20% to about 35%, or from about 24% to about 26%.

Figure 5A:
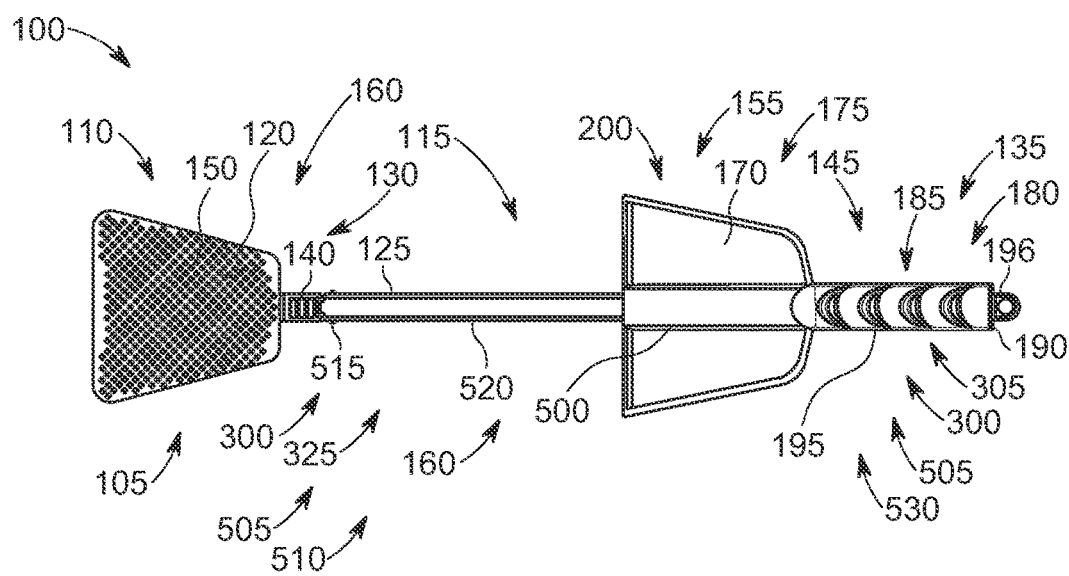
FIG. 5A is a schematic top view of another version of a bug swatter of the invention in an uncovered configuration.

FIG. 5A shows another version of a bug swatter 100 according to the invention. Optionally, in the version shown in FIG. 5A, the cover member 155 includes a channel 500 in its top wall 225 and/or its bottom wall 230 to receive the shaft 125 of the handle portion 115 as the cover member 155 slides thereon. As also shown, in the version of FIG. 5A the locking mechanism 300 is a frictional locking mechanism 505 that in the version shown is internally contained within the cover member 155. The frictional locking mechanism 505 applies an increased frictional force to maintain the cover member 155 at a particular location on the handle portion 115. To unlock the frictional locking mechanism 505 a user applies a sufficiently strong force to overcome the frictional locking force to thereby allow the cover member 115 to slide freely on the shaft 125 of the handle member 115.

Figure 5B:
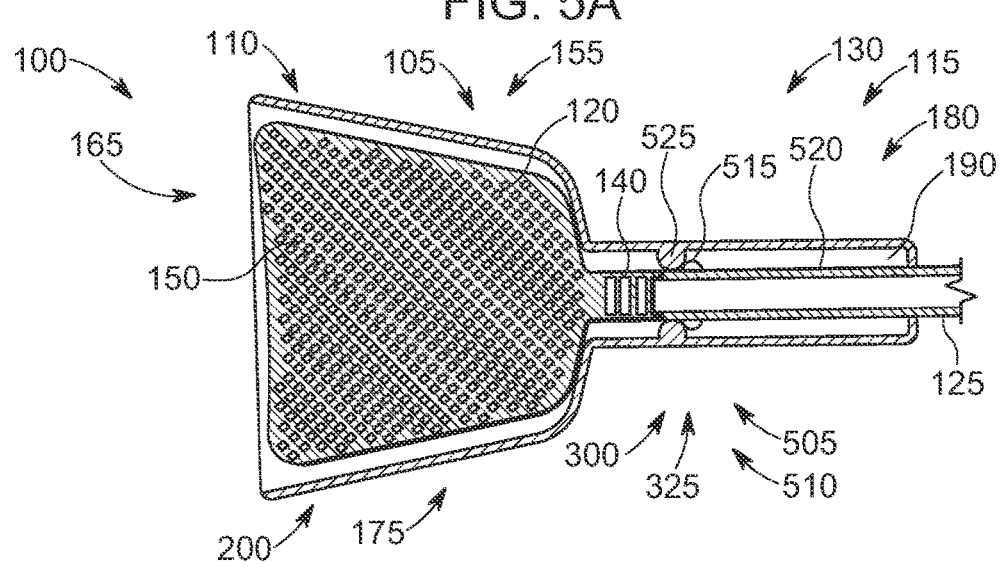
FIG. 5B is a partially sectional top view of the bug swatter of FIG. 5A in a covered configuration.

FIG. 5B shows an example of a locking mechanism 300 where the covered configuration locking mechanism 325 is a frictional covered configuration locking mechanism 510. In this version, a covered configuration detent 515 is provided on an outer surface 520 of the shaft 125 of the handle portion 115. A protrusion 525 is provided that extends inwardly from the interior wall of the lumen 190 of the cover member 155. The covered configuration detent 515 and the protrusion 525 are positioned so that when in the extended position shown in FIG. 5B, the cover member 115 is in the covered configuration 165. The covered configuration detent 515 and the protrusion 525 cooperate in this position to lock the cover member 155 in the covered configuration 165 by creating an increased frictional force that helps to maintain the cover member 155 in its forward or extended position and prevents the cover member 155 from easily sliding rearwardly. To unlock the frictional covered configuration locking mechanism 510, a user can apply a rearward force on the cover member 155 that is sufficiently strong to urge the protrusion 525 past the covered configuration detent 515 at which point the cover member 155 can slide freely in the rearward direction. Conversely, to place the cover member 155 in the covered configuration 165, the cover member 155 is slid on the shaft 125 in the forward direction until protrusion 525 contacts the covered configuration detent 515. The user then forces the cover member 155 forward so that the protrusion 525 is urged past the covered configuration detent 515. The covered configuration detent 515 can be a rib that extends at least partially around the shaft 125. In the particular version shown, the covered configuration detent 515 is an annular rib. Alternatively, the covered configuration detent 515 can be in the form of one or more circular or otherwise shaped knobs. Similarly, the protrusion 525 can be an inwardly projecting rib and knob. In the particular version shown, the protrusion 525 is in the form of one or more cylindrical or partially cylindrical chords.

Figure 5C:
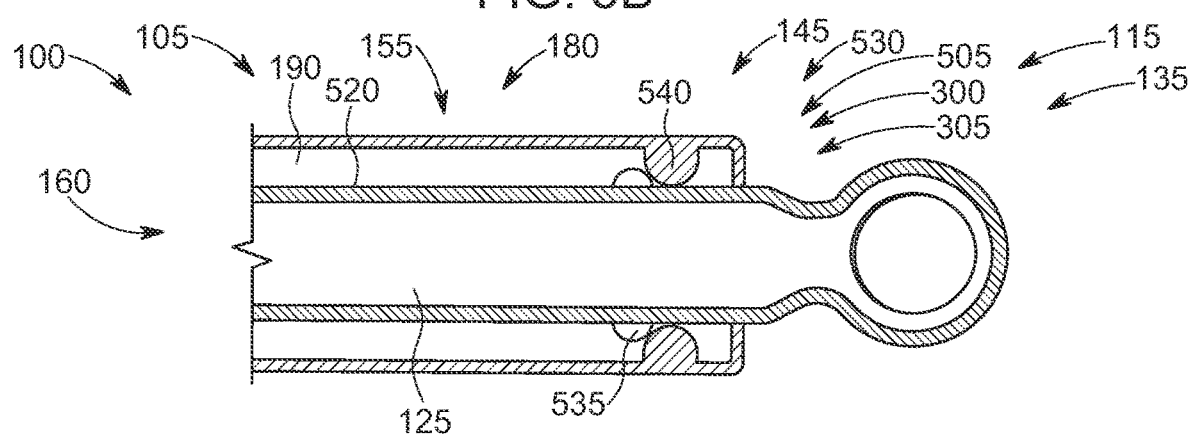
FIG. 5C is a partially section top view of the bug swatter of FIG. 5A in an uncovered configuration.

FIG. 5C shows an example of a locking mechanism 300 where the uncovered configuration locking mechanism 305 is a frictional uncovered configuration locking mechanism 530. In this version, an uncovered configuration detent 535 is provided on an outer surface 520 of the shaft 125 of the handle portion 115. An uncovered configuration protrusion 540 is provided that extends inwardly from the interior wall of the lumen 190 of the cover member 155. The uncovered configuration protrusion 540 can be the same protrusion 525 that is used for the frictional covered configuration locking mechanism 510 or may be a different protrusion that is the same or different shape than the protrusion 525. The uncovered configuration detent 535 and the uncovered configuration protrusion 540 are positioned so that when in the retracted position shown in FIG. 5C, the cover member 115 is in the uncovered configuration 160, and the bug swatter 100 is ready for use as a swatter. The uncovered configuration detent 535 and the uncovered configuration protrusion 540 cooperate in this position to lock the cover member 155 in the uncovered configuration 160 by creating an increased frictional force that helps to maintain the cover member 155 in its rearward or retracted position and prevents the cover member 155 from easily sliding forwardly. To unlock the frictional uncovered configuration locking mechanism 530, a user can apply a forward force on the cover member 155 that is sufficiently strong to urge the uncovered configuration protrusion 540 past the uncovered configuration detent 535 at which point the cover member 155 can slide freely in the forward direction. Conversely, to place the cover member 155 in the uncovered configuration 165, the cover member 155 is slid on the shaft 125 in the rearward direction until uncovered configuration protrusion 540 contacts the uncovered configuration detent 535. The user then forces the cover member 155 rearward so that the uncovered configuration protrusion 540 is urged past the uncovered configuration detent 535. The uncovered configuration detent 535 can be a rib that extends at least partially around the shaft 125. In the particular version shown, the uncovered configuration detent 535 is an annular rib. Alternatively, the uncovered configuration detent 535 can be in the form of one or more circular or otherwise shaped knobs. Similarly, the uncovered configuration protrusion 545 can be an inwardly projecting rib and knob. In the particular version shown, the uncovered configuration protrusion 540 is in the form of one or more cylindrical or partially cylindrical chords.

Figure 6A:
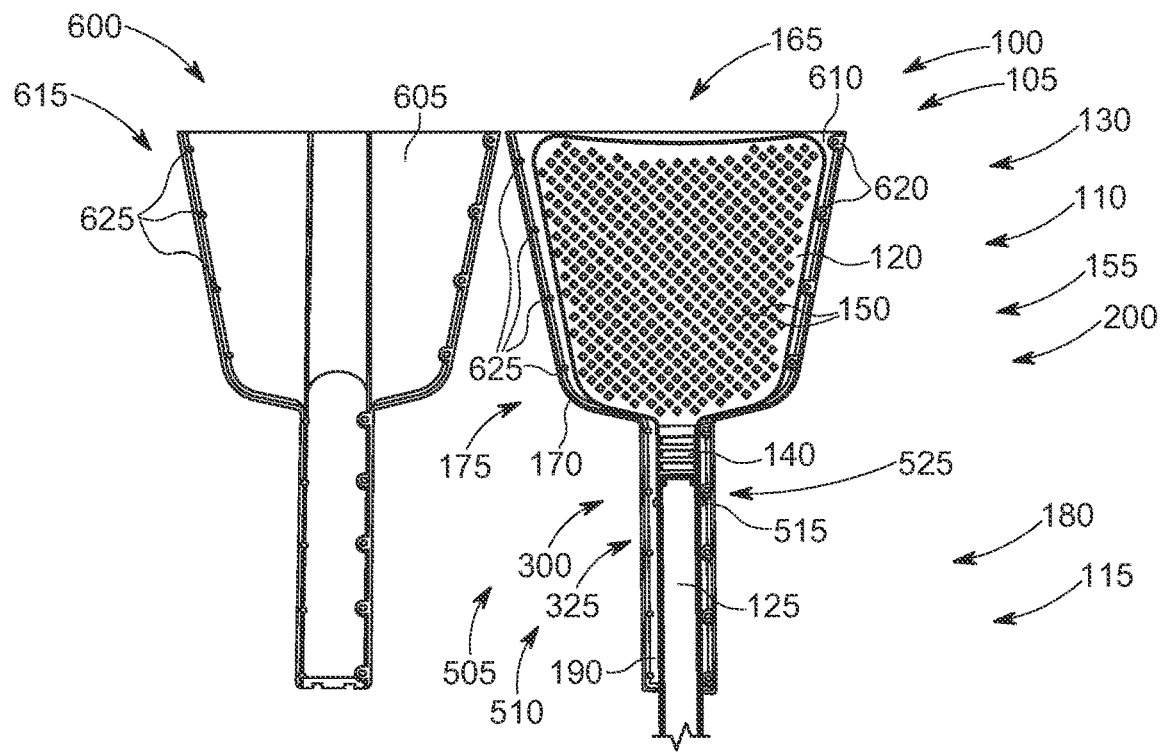
FIG. 6A is a separated top view of another version of a bug swatter of the invention in a covered configuration.
Figure 6B:
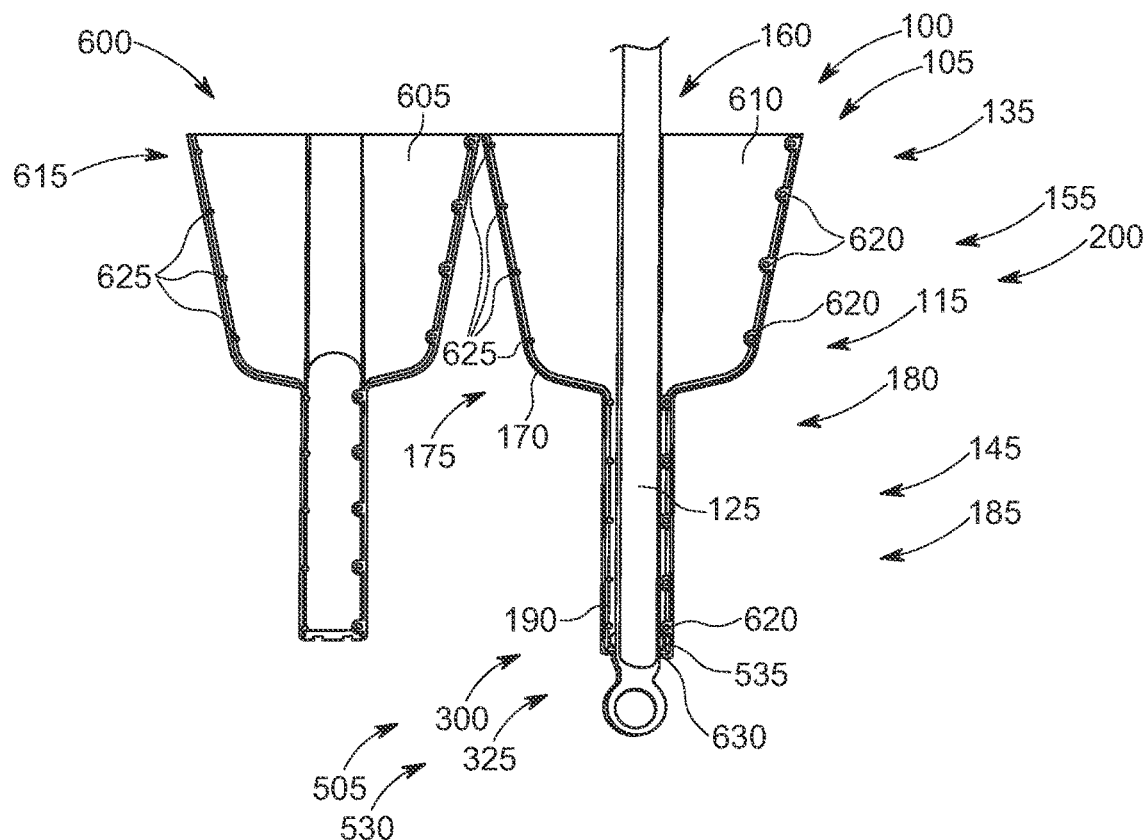
FIG. 6B is a separated top view of the bug swatter of FIG. 6A in an uncovered configuration.

A particular version of bug swatter 100 in accordance with the version of FIGS. 5A through 5C is shown in FIGS. 6A and 6B. In this version, the cover member 155 is a separable cover member 600. The separable cover member 600 is made up of a longitudinally separable top portion 605 and bottom portion 610 that are connectable by an attachment mechanism 615. When the top portion 605 and the bottom portion 610 are connected to one another, the separable cover member 600 operates as any of the versions of the above-described cover member 155. By being separable, the cover member 155 is readily injection moldable during manufacture, and the installation of the cover member 155 onto the handle portion 115 is easily facilitated. In one version, once attached, the connection is permanent and the separable cover member 600 functions as if it was a single piece. In this version, the two halves can optionally be thermally welded together. Alternatively, the top portion 605 and the bottom portion 610 of the separable cover member 600 can be separated following use in order to clear and/or replace the cover member 155. In the particular version shown, the attachment mechanism 615 is made up of a plurality of female cylinders 620 or the like on one of the portions that each matingly receive a male cylinder 625 or the like on the other portion in a frictional engagement. When mated, each female cylinder 620 and its corresponding male cylinder 625 make a solid cylindrical chord. The female cylinders 620 and corresponding male cylinders 625 can be positioned and distributed in any manner. In the version shown, female cylinders 620 are positioned on the right side of the bottom portion 610 and male cylinders are positioned on the left side of the bottom portion 610 and the top portion 605 has female cylinders 620 on its left side when attached and male cylinders 625 on its right side when attached. Alternatively, all female cylinders 620 can be on the bottom portion 605 or the top portion 610 and all male cylinders 625 on the other portion.

FIG. 6A shows the separable cover member 600 with the top portion 605 separated from the bottom portion 610 in the position of the covered configuration 165 to show that optionally one or more of the cylindrical chords can also serve as the protrusion 525 that engages the covered configuration detent 515. Similarly, a cylindrical chord, such as the same or different cylindrical chord that serves as the protrusion 525, can also serve as the uncovered configuration protrusion 540. Alternatively, as shown in FIG. 6B which shows the separable cover member 600 with the top portion 605 separated from the bottom portion 610 in the position of the uncovered configuration 160, a separate member, such as an end wall 630 can serve as the uncovered configuration protrusion 540.

The bug swatter 100 of the present invention can also alternatively include other cover member 155 arrangements. For example, as shown in FIG. 7A, the cover member 155 of the bug swatter 100 can be a removable cover member 700. The removable cover member 700 is removable from the body 105 when the bug swatter 100 is in the uncovered configuration 160 and then affixable to the body 105 when the bug swatter 100 is in the covered configuration 165. The removable affixation can be accomplished by any suitable manner, such as by clips and/or straps. In another version, the removable cover member 155 can come in multiple parts, such as one that can cover the top of the swatter head 110 and one that can cover the bottom of the swatter head 110. FIGS. 7B and 7C show another version of a bug swatter 100. In this version, the cover member 155 is a rotatable cover member 705 that is connected to the shaft 125 by a pivoting connection 710. In this version, the rotatable cover member 705 is rotatable between the uncovered configuration 160 shown in FIG. 5B and the covered configuration 165 shown in FIG. 5C. In another version, the rotatable cover member 705 can include multiple members positionable on opposite sides of the swatter head 110 that are capable of enclosing the swatter head 110 like jaws that are each rotatable between the uncovered configuration 160 and the covered configuration 165.

In another version, the handle portion 115 can include a telescopic shaft where the swatter head 110 can be pulled out of the cover member 155 by expanding the telescopic shaft and then pushed back into the cover member 155 by collapsing the telescopic shaft.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number, and all directional limitations, such as up and down and the like, can be switched, reversed, or changed as long as doing so is not prohibited by the language herein with regard to a particular version of the invention. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Throughout this specification and any claims appended hereto, unless the context makes it clear otherwise, the term "consisting of" and "consisting essentially of" and their variations such as "consists" should be understood to imply the inclusion of a stated element, limitation, or step and not the exclusion of any other elements, limitations, or steps or any other non-essential elements, limitations, or steps, respectively. Throughout the specification, any discussed on a combination of elements, limitations, or steps should be understood to include a disclosure of additional elements, limitations, or steps and the disclosure of the exclusion of additional elements, limitations, or steps. All numerical values, unless otherwise made clear in the disclosure or prosecution, include either the exact value or approximations in the vicinity of the stated numerical values, such as for example about +/−ten percent or as would be recognized by a person or ordinary skill in the art in the disclosed context. The same is true for the use of the terms such as about, substantially, and the like. Also, for any numerical ranges given, unless otherwise made clear in the disclosure, during prosecution, or by being explicitly set forth in a claim, the ranges include either the exact range or approximations in the vicinity of the values at one or both of the ends of the range. When multiple ranges are provided, the disclosed ranges are intended to include any combinations of ends of the ranges with one another and including zero and infinity as possible ends of the ranges. Therefore, any appended or later filed claims should not be limited to the description of the preferred versions contained herein and should include all such alterations, permutations, and equivalents as fall within the true spirit and scope of the present invention.

What is claimed is:

1. A bug swatter comprising:
a swatter body comprising a swatter head connected to a handle portion, wherein the handle portion can be manipulated by a user so the user can advance the swatter head towards a bug to swat the bug and wherein the swatter head comprises a swatter member that is at least partially flat and comprises one or more perforations; and
a cover member connectable to the handle portion and moveable along at least a portion of a length of the handle portion relative to the swatter head,
wherein the bug swatter can be moved from an uncovered configuration where the swatter head is uncovered by the cover member to a covered configuration where at least a portion of the cover member covers at least a portion of the swatter head, and wherein the bug swatter comprises a locking mechanism adapted to lock the bug swatter in the covered configuration.

2. A bug swatter according to claim 1 wherein the locking mechanism can be unlocked by a user so the bug swatter can be moved from the covered configuration to the uncovered configuration.

3. A bug swatter according to claim 2 wherein the locking mechanism can be unlocked by the user applying a sufficiently strong force to overcome the locking mechanism.

4. A bug swatter according to claim 1 wherein the bug swatter comprises a locking mechanism adapted to lock the bug swatter in the uncovered configuration.

5. A bug swatter according to claim 1 wherein the cover member is slidably connected to the handle portion and is slidable along a shaft of the handle portion.

6. A bug swatter according to claim 1 wherein the cover member is slidably connected to the handle portion and is slidable along a shaft of the handle portion from a retracted position to an extended position, wherein when in the retracted position the bug swatter is in the uncovered configuration and when in the extended position the bug swatter is in the covered configuration.

7. A bug swatter according to claim 1 wherein the cover member is slidably connected to the handle portion and is slidable along a shaft of the handle portion from a retracted position to an extended position, wherein when in the retracted position the bug swatter is in the uncovered configuration and when in the extended position the bug swatter is in the covered configuration, and wherein the locking mechanism is adapted to lock the cover member in the extended position.

8. A bug swatter according to claim 1 wherein the cover member is slidably connected to the handle portion and is slidable along a shaft of the handle portion from a retracted position to an extended position, wherein when in the retracted position the bug swatter is in the uncovered configuration and when in the extended position the bug swatter is in the covered configuration, wherein the locking mechanism is adapted to lock the cover member in the extended position, and wherein the bug swatter comprises a locking mechanism adapted to lock the cover member in the retracted position.

9. A bug swatter according to claim 8 wherein the locking mechanism adapted to lock the cover member in the retracted position comprises a detent on the shaft that is engageable with a protrusion on the cover member.

10. A bug swatter comprising:
a swatter body comprising a swatter head connected to a handle portion, wherein the handle portion can be manipulated by a user so the user can advance the swatter head towards a bug to swat the bug; and
a cover member connectable to the handle portion and moveable relative to the swatter head, wherein the bug swatter can be moved from an uncovered configuration where the swatter head is uncovered by the cover member to a covered configuration where at least a portion of the cover member covers at least a portion of the swatter head, wherein the cover member is slidably connected to the handle portion and is slidable along at least a portion of a shaft of the handle portion from a retracted position to an extended position, wherein when in the retracted position the bug swatter is in the uncovered configuration and when in the extended position the bug swatter is in the covered configuration, and wherein the bug swatter comprises a locking mechanism adapted to lock the cover member in the retracted position and a locking mechanism adapted to lock the cover member in the extended position, and wherein the locking mechanism is adapted to lock the cover member in the retracted position comprises a first detent on the shaft that is engageable with a first protrusion on the cover member, and wherein the locking mechanism adapted to lock the cover member in the extended position comprises a second detent on the shaft that is engageable with a second protrusion on the cover member.

11. A bug swatter according to claim 1 wherein in the covered configuration the cover member surrounds at least about 90% of the swatter head in transverse cross section.

12. A bug swatter according to claim 1 wherein the cover member includes a cover portion shaped to correspond generally to the swatter member and a graspable portion shaped to correspond generally to the handle portion, and wherein when in the uncovered configuration, the handle portion can be manipulated by a user grasping the graspable portion of the cover member.

13. A bug swatter comprising:
a swatter body comprising a swatter head connected to a handle portion, wherein the handle portion can be manipulated by a user so the user can advance the swatter head towards a bug to swat the bug;
a cover member connectable to the handle portion and slidable on at least a portion of a shaft of the handle portion, and
a locking mechanism adapted to lock the cover member at a position on the shaft by preventing movement of the cover member in one or more directions on the shaft until the locking mechanism is unlocked,
wherein the locking mechanism comprises a detent extending from the shaft of the handle portion and a protrusion in the cover member that is adapted to engage the detent to lock the cover member at the position on the shaft.

14. A bug swatter according to claim 13 wherein the locking mechanism can be unlocked by the user applying a sufficiently strong force to overcome the locking mechanism.

15. A bug swatter according to claim 13 wherein the locking mechanism locks the cover member on the shaft at a position where the cover member does not cover the swatter head.

16. A bug swatter according to claim 13 wherein the locking mechanism can lock the cover member at a plurality of positions on the shaft.

17. A method of swatting a bug, the method comprising:
providing a bug swatter comprising a swatter body comprising:
a swatter head connected to a handle portion, wherein the handle portion can be manipulated by a user so the user can advance the swatter head towards a bug to swat the bug, and
a cover member connectable to the handle portion and moveable along at least a portion of a length of the handle portion relative to the swatter head;
positioning the bug swatter in an uncovered configuration where the swatter head is uncovered by the cover member;
swatting a bug by advancing the swatter head towards the bug; and
moving the bug swatter to a covered configuration where at least a portion of the cover member covers at least a portion of the swatter head; and
locking the bug swatter in the covered configuration.

18. A method according to claim 17 further comprising locking the bug swatter in the uncovered configuration.

19. A bug swatter according to claim 13 wherein the locking mechanism comprises a second detent on the shaft of the handle portion so that the cover member can be locked at a second position on the shaft.

* * * * *